Nov. 13, 1928.
F. K. KILIAN
1,691,659
CASTER
Filed March 13, 1923
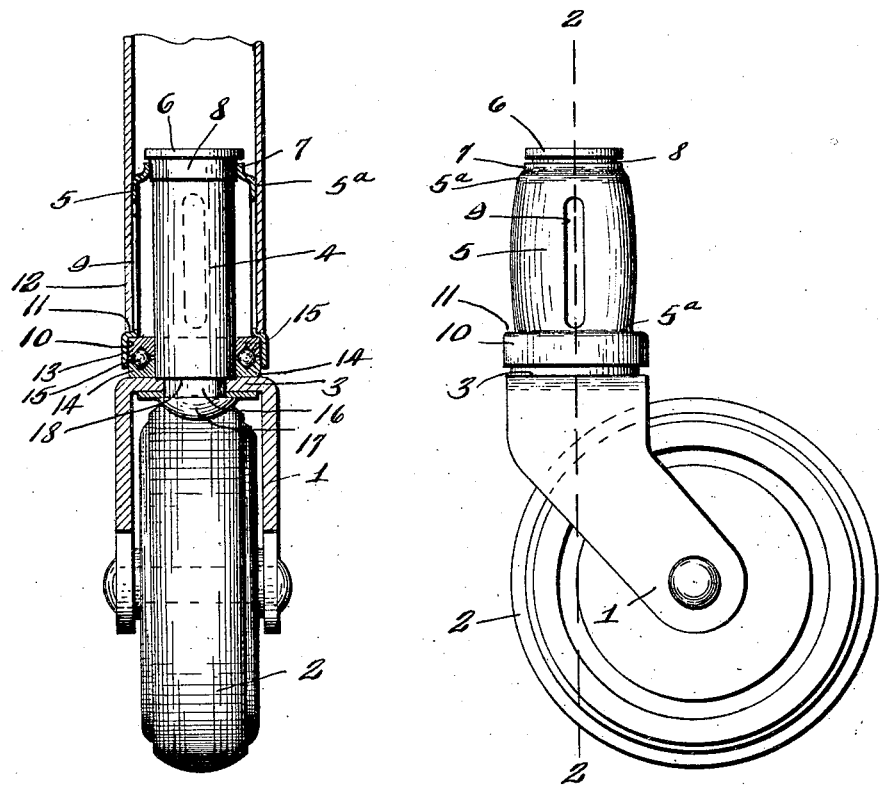
INVENTOR.
Frederick K. Kilian
BY Parsons & Bordell
ATTORNEYS.

Patented Nov. 13, 1928.

1,691,659

UNITED STATES PATENT OFFICE.

FREDERICK K. KILIAN, OF SYRACUSE, NEW YORK.

CASTER.

Application filed March 13, 1923. Serial No. 624,843.

This invention relates to casters for various kinds of furniture, and has for its object a caster which is particularly simple and economical in construction, readily applied and removed from the furniture and firmly held against unintentional displacement.

The invention consists in the novel features and in the combinations and constructions hereinafter set forth and claimed.

In describing this invention, reference is had to the accompanying drawings, in which like characters designate corresponding parts in all the views.

Figure 1 is an elevation of this caster.

Figure 2 is a sectional view on line 2—2, Fig. 1, the contiguous portion of the leg of a piece of furniture being also shown.

This caster comprises a fork in which the caster wheel is mounted, the fork having an upwardly extending stud provided with a shoulder at its upper end, a resilient or radially compressible and expansible tubular shell encircling the stud and having at its upper end below the shoulder the shell bulging from its ends toward its middle portion and being provided at its lower end with an annular socket of greater diameter than the bulging of the shell, the upper outer face of this socket providing a shoulder against which the lower end of the furniture leg thrusts, raceways for antifriction members surrounding the stud and located in the socket and interposed between the bottom of the socket and the fork.

1 designates the fork and 2, the wheel mounted on the axle carried by the fork. The fork includes an intermediate horizontal portion 3, the upper face of which is substantially flat.

4 is the stud and 5 the resilient tubular shell, which constitute the shank of the fork. The stud 4 is provided with an integral annular flange or shoulder 6 at its upper end and the tubular shell 5 thrusts against this shoulder 6 and is provided with a contracted portion 7 at its upper end encircling or slidably fitting a circumferential face 8 on the stud 4 beneath the shoulder 6. The shell 5 is tubular and bulges from its ends toward its intermediate portion and is also formed with lengthwise slots 9 which terminate short of both ends thereof, these slots forming lengthwise strips which tend to spring radially outwardly and yield inwardly when the shank is inserted in the socket in the end of the leg of the piece of furniture.

The shell 5 is also formed with an integral annular socket 10 at its lower end of greater diameter than the middle or bulging portion of the shell, the outer upper face 11 of this socket constituting a shoulder against which the lower edge of the leg 12 of the piece of furniture thrusts when the shank of the fork is inserted in the socket of such leg. The leg here shown is tubular. The upper and lower end portions 5ª of the shell 5 are of substantially the same diameter as the internal diameter of the leg 12 so that when the shell is placed in the leg, said shell compresses into cylindrical form, and hence is held against lateral whipping or rocking movement. In other words, the shank is held rigid with its axis alined with the axis of the leg 12.

13 and 14 are raceways for antifriction members, as balls 15, these raceways being located in the annular socket 10 about the stud, and the raceway 13 thrusting against the bottom of the socket and the raceway 14 against the flat upper face of the intermediate part 3 of the fork around the stud.

The stud is attached to the fork by means of a reduced axial extension 16 at its lower end which extends through a hole in the intermediate member 3 of the fork and is riveted at 17, or otherwise secured to the intermediate part 3 of the fork. The shoulder 18, provided at the base of the reduced extension 16, thrusts against the upper face of the intermediate portion of the fork 3.

In assembling the parts, the resilient sleeve 5 is first placed on the stud 4 against the shoulder 6, the raceways with the balls between them are then placed on the stud and in the socket 10, the reduced portion 16 then attached to the fork. Thereafter, the wheel 2 is mounted on the fork.

Owing to this assembly the caster is particularly simple and economical in construction, and owing to the construction of the resilient sleeve, the caster is quickly applied and detached from the furniture and firmly held from unintentional detachment.

What I claim is:

A caster for furniture and the like comprising a fork having an upwardly extending stud formed with a shoulder at its upper end and a resilient tubular shell on the stud and located below the shoulder, the shell being formed with lengthwise slots terminating short of its ends and being open at its ends and bulging between its ends, the shell also being provided at its lower end with an integral annular enlargement of greater diameter than the tubular portion of the shell, the outer face of the enlargement providing an exterior annular shoulder and raceways located within the enlargement and interposed between the bottom of the enlargement and the upper face of the fork around the stud.

In testimony whereof, I have hereunto signed my name at Syracuse, in the county of Onondaga and State of New York, this 18th day of January, 1923.

FREDERICK K. KILIAN.